(12) United States Patent
Tokuda et al.

(10) Patent No.: US 6,273,464 B2
(45) Date of Patent: *Aug. 14, 2001

(54) GAS PRODUCER FOR AIR BAG

(75) Inventors: Masakazu Tokuda; Akihisa Ogawa, both of Himeji (JP)

(73) Assignee: Daicel Chemical Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/284,279
(22) PCT Filed: Oct. 29, 1996
(86) PCT No.: PCT/JP96/03167
§ 371 Date: Jun. 17, 1999
§ 102(e) Date: Jun. 17, 1999
(87) PCT Pub. No.: WO98/18660
PCT Pub. Date: May 7, 1998

(30) Foreign Application Priority Data

Sep. 22, 1995 (JP) ................................................. 7-244440

(51) Int. Cl.[7] ................................................. B60R 21/28
(52) U.S. Cl. ........................ 280/741; 280/740; 280/742; 280/743.1; 280/736; 280/737; 102/530; 102/531
(58) Field of Search ................................... 280/741, 740, 280/742, 736, 737, 743.1; 102/530, 531, 740

(56) References Cited

U.S. PATENT DOCUMENTS

| | | | |
|---|---|---|---|
| 3,477,374 | * | 11/1969 | Barr ........................................ 102/740 |
| 4,066,415 | * | 1/1978 | Kasama et al. ........................... 23/281 |
| 4,353,304 | * | 10/1982 | Hubsch et al. ......................... 102/470 |
| 4,561,675 | * | 12/1985 | Adams et al. ......................... 280/734 |
| 4,590,041 | * | 5/1986 | Hill ........................................ 422/165 |
| 4,734,265 | * | 3/1988 | Nilsson et al. ......................... 422/165 |
| 4,902,036 | * | 2/1990 | Zander et al. .......................... 280/736 |
| 5,060,973 | * | 10/1991 | Giovanetti ............................. 280/736 |
| 5,104,466 | * | 4/1992 | Allard et al. ............................ 149/21 |
| 5,221,107 | * | 6/1993 | O'Loughlin ........................... 280/728 |
| 5,372,281 | * | 12/1994 | Herridge ............................... 280/743 |
| 5,419,578 | * | 5/1995 | Storey et al. ......................... 280/741 |
| 5,431,103 | * | 7/1995 | Hock et al. ............................ 102/287 |
| 5,470,406 | * | 11/1995 | Ochi et al. .............................. 149/35 |
| 5,481,978 | * | 1/1996 | Muller et al. .......................... 102/470 |
| 5,556,130 | * | 9/1996 | Fulmer .................................. 280/741 |
| 5,738,374 | * | 4/1998 | Marsaud et al. ...................... 280/741 |
| 5,779,267 | * | 7/1998 | Jordan et al. .......................... 280/740 |

FOREIGN PATENT DOCUMENTS

| | | |
|---|---|---|
| 4-78745 | 3/1992 | (JP) . |
| 7112652 | 5/1995 | (JP) . |
| WO 93/21036 * | 10/1993 | (WO) . |
| WO 93/21037 * | 10/1993 | (WO) . |

* cited by examiner

Primary Examiner—Charles T. Jordan
Assistant Examiner—Glenda L. Sánchez

(57) ABSTRACT

A gas generator for an airbag has a reduced number of components and in which an automatic ignition material can ignite at an appropriate time. This gas generator includes a housing, an ignition unit accommodating chamber in the housing, an ignition unit installed in the ignition unit accommodating chamber, a gas generating material, and a cooling and purifying unit. The ignition unit includes a transfer charge container and an igniter. The transfer charge container has a cup containing a transfer charge and a cover hermetically sealing the cup. The igniter is activated by a signal to ignite the transfer charge, and a generated gas is introduced into an airbag to protect an occupant against an impact. The transfer charge container includes a cup part and a cover part, either the bottom of the cup part or the cover part are outwardly curved to form an outwardly convex surface. The container is resiliently held between a top wall portion of the ignition unit accommodating chamber and the igniter.

7 Claims, 2 Drawing Sheets

GAS PRODUCER FOR AIR BAG

This application is the national phase under 35 U.S.C. §371 of PCT International Application No. PCT/JP96/03167 which has an International filing date of Oct. 29, 1996, which designated the United States of America.

BACKGROUND OF THE INVENTION

The present invention relates to an airbag gas generator for protecting an occupant from impacts and more specifically to a construction of an ignition unit of the gas generator.

RELATED ART

An example of a conventional airbag gas generator is illustrated in FIG. 3. This gas generator includes: a housing 31 having gas discharge ports 30; an ignition unit accommodating chamber 32 defined in a central part of the housing 31; an ignition unit 33 installed in the ignition unit accommodating chamber 32; a canister 34 containing a gas generating material, i.e. a gas generating agent that generates a gas when ignited by the ignition unit; and a cooling and cleaning unit, i.e., a coolant 35 and a filter 36, for cooling and cleaning the generated gas.

The ignition unit 33 includes a transfer charge container 38 containing a transfer charge 37 and an igniter 39 that is activated by a signal to ignite the transfer charge 37.

When a sensor (not shown) detects an impact, a sensor signal is sent to the igniter 39, which is then activated to ignite the transfer charge 37. The transfer charge, when ignited, generates high-temperature and high-pressure flames, which pass through openings 40 into a combustion chamber 41, fracture the wall of the canister 34 and then ignite the gas generating agent. Then, the gas generating agent burns to generate a gas, which then enters a coolant filter chamber 43 from passing ports of a combustor cup 42 defining the combustion chamber. The gas is cooled and removed of combustion residues while it passes through the coolant 35. And while the gas passes through the filter 36, the remaining combustion residues are further removed, and the cooled and cleaned gas flows through the gas discharge ports 30 into an airbag (not shown). The inflow-gas inflates the airbag, forming a cushion between an occupant and a hard structure.

In the airbag gas generator used in an automobile, components are preassembled. For example, the transfer charge container and the igniter are installed in the ignition unit accommodating chamber so that they are in contact with each other.

A gap may occur between components due to tolerances of components and assembly errors. There is a possibility that the transfer charge container, for example, may move in this gap or strike against the igniter and destroyed.

To prevent the inner components from being dislocated or moving out of contact with associated components due to vibrations, the inner components need to be fixed. For this purpose, an resilient cushion is used.

In the above conventional gas generator, a cushion 45 is installed between the transfer charge container 38 and a hollow screw member 44 defining the ignition unit accommodating chamber 32. This cushion 45 allows the transfer charge container 38 to be resiliently pressed against the igniter 39, preventing the movement of the transfer charge container 38 and also preventing the transfer charge container 38 from hitting against the igniter 39.

In the event a vehicle incorporating the airbag gas generator catches fire, the gas generator is heated causing its interior to reach several hundred degrees. When at this elevated temperature the gas generating agent and transfer charge in the gas generator spontaneously burn, the housing may be destroyed and the damaged components may scatter.

To prevent this, an automatic ignition material (AIM) 23 is installed in the transfer charge container. The AIM has a low ignition point and thus ignites before the gas generating agent and the transfer charge spontaneously burn. The ignition of this AIM ensures the combustion of the transfer charge and the gas generating agent, thus preventing their spontaneous combustion and destruction of the housing. This AIM is arranged close to the outer wall of the housing to ensure that the heat of the outer side of the gas generator is transferred well to the AIM.

The conventional gas generator, however, requires a cushion between the transfer charge container and the hollow screw member, which in turn increases the number of components and manhours for assembly.

Further, the presence of a cushion between the transfer charge container and the hollow screw member blocks heat conduction, preventing the heat of the outer side of the gas generator from being transferred to the AIM well, which in turn may delay the ignition timing of the AIM.

SUMMARY OF THE INVENTION

It is therefore an object of the present invention to provide a novel airbag gas generator that solves the problems experienced with the above conventional airbag gas generator.

An airbag gas generator according to this invention comprises: a housing having gas discharge ports; an ignition unit accommodating chamber formed in a central part of the housing; an ignition unit installed in the ignition unit accommodating chamber; a gas generating unit to be ignited by the ignition unit and generate a gas; and a cooling and purifying unit for cooling and purifying the gas generated by the gas generating element; wherein the ignition unit includes a transfer charge container and an igniter, the transfer charge container having a cup for accommodating a transfer charge and a cover for hermetically closing the cup, the igniter to be activated by a signal and ignite the transfer charge; wherein the gas generated by the gas generating element in response to an impact is introduced into an airbag to protect an occupant against the impact; wherein the transfer charge container includes a cup part and a cover part, either of the bottoms of the cup part and the cover part being outwardly curved to form an outwardly convex surface, the container being resiliently held between a top wall portion of the ignition unit accommodating chamber and the igniter.

In the transfer charge container used in this gas generator, the bottom of the cover or cup has a convex surface. This convex bottom can resiliently deflect upon receiving a pressing force. The deflection of the convex bottom applies a resilient force to the top wall portion of the ignition unit accommodating chamber and to an igniter. In this way, the transfer charge container is resiliently held between the ceiling portion of the ignition unit accommodating chamber and the igniter.

Because of the above construction, this invention can eliminate the cushion installed between the transfer charge container and the top wall portion of the ignition unit accommodating chamber. This offers the advantages of reducing the number of components and manhours for assembly.

Further, because no cushion is provided between the transfer charge container and the top wall portion, the heat conduction is improved, allowing heat on the outer side of the gas generator to be transferred efficiently to the AIM, which can then be ignited at an appropriate timing. This in turn secures safety.

EMBODIMENT OF THE INVENTION

Figure 1:
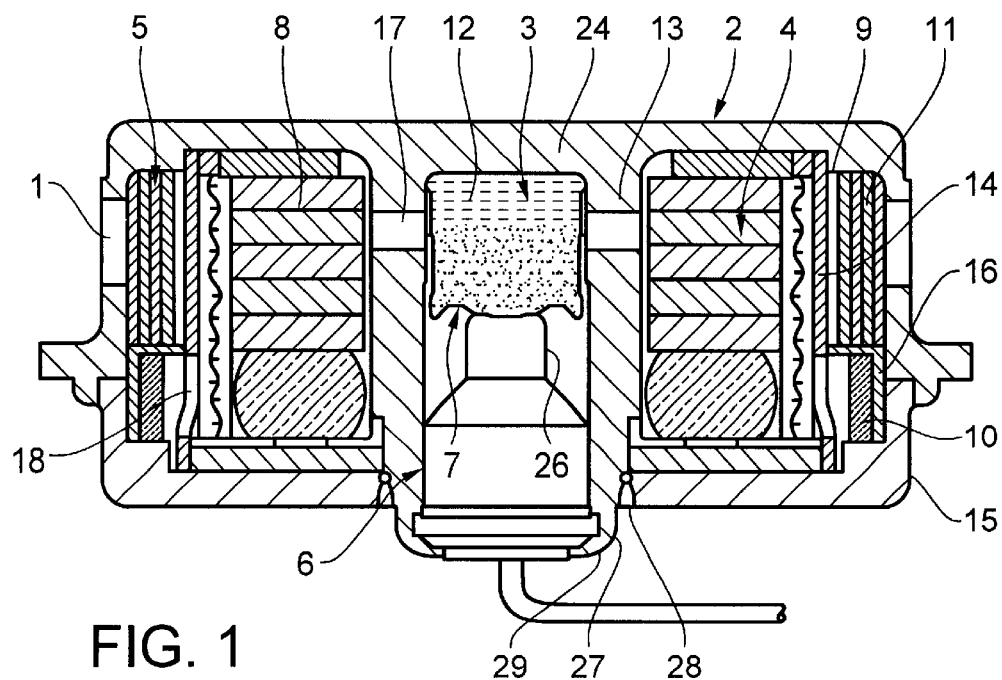
FIG. 1 is a cross-sectional view of one embodiment of a gas generator.

Now, one embodiment of the present invention will be described by referring to the drawings.

FIG. 1 is a cross-sectional view of a gas generator according to an embodiment of this invention. This gas generator includes: a housing 2 having gas discharge ports 1; an ignition unit accommodating chamber 3 defined in a central part of the housing 2; a combustion chamber 4 formed along the outer circumference of the ignition unit accommodating chamber 3; a coolant filter chamber 5 formed along the outer circumference of the combustion chamber 4; an ignition unit, i.e., an igniter 6 and a transfer charge container 7, arranged in the ignition unit accommodating chamber 3; a canister 9 installed in the combustion chamber 4 and filled with a gas generating agent 8, the gas generating agent 8 to be ignited by the ignition unit and generate a gas; and a coolant 10 and a filter 11, both installed in the coolant filter chamber 5 to cool and purify the combustion gas generated in the canister.

The ignition unit accommodating chamber 3 is defined by a center cylindrical portion 13. The combustion chamber 4 is defined by the center cylindrical portion 13 and a combustion ring 14 enclosing the center cylindrical portion on its outer side. The coolant filter chamber 5 is defined by the combustion ring 14 and an outer wall portion 15 enclosing the combustion ring on its outer side. The coolant filter chamber 5 is divided into an upper tier chamber and a lower tier chamber by a retainer 16.

Between the ignition unit accommodating chamber 3 and the combustion chamber 4 are provided passages 17 that transfer flames produced in the ignition unit accommodating chamber 3 into the combustion chamber 4. Between the combustion chamber 4 and the coolant filter chamber 5, a plurality of gas passing ports 18 for a combustion gas generated in the combustion chamber 4 are formed in the circumferential direction in the combustion ring 14. Further, between the coolant filter chamber 5 and the airbag (not shown), a plurality of gas discharge ports 1 are formed in the circumferential direction.

The canister 9 is made of a thin aluminum container that forms an annular space and contains the gas generating agent 8 therein.

Figure 2:
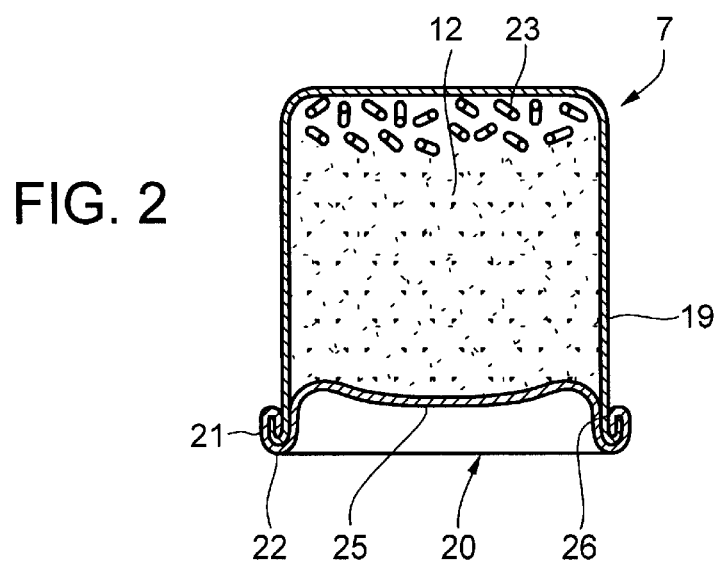
FIG. 2 is a cross-sectional view of a transfer charge container in the gas generator shown in FIG. 1.
Figure 3:
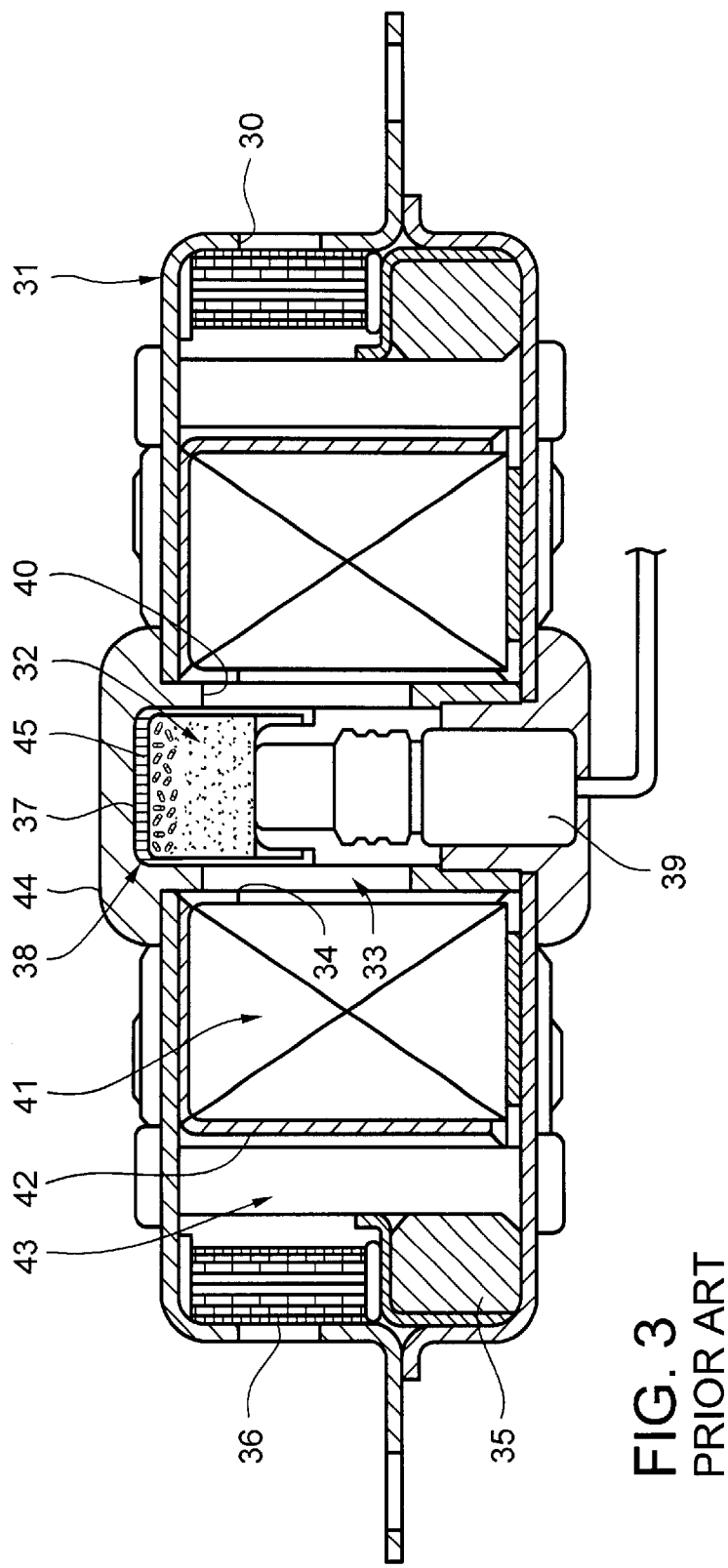
FIG. 3 is a cross-sectional view of a conventional gas generator.

FIG. 2 is a cross-sectional view of the transfer charge container 7 installed in the gas generator of this invention. This transfer charge container 7 is made by joining a cup 19 and a cover 20, both of which are formed of a thin aluminum plate.

The cup 19 is a hollow cylinder with one closed end and one opened end. The opened end has an outwardly directed flange 21 along the circumference thereof. The cover 20 is shaped like a circular dish and has a generally spherical bottom 25 and a circumferential wall 26 with an outwardly extending flange 22.

After the cup 19 of the transfer charge container 7 is filled with an ignition material, it is hermetically sealed by pressing the cover 20, with the cover flange 22 against the cup flange 21 and engaging the flange 22 with the flange 21. The cup flange and the cover flange may also be joined together as by adhesive, heat seal, and ultrasonic welding.

The transfer charge container 7 is filled with a transfer charge 12 and an AIM (automatic ignition material) 23. The AIM is disposed on the closed end side of the cup 19, i.e., on the top wall 24 side of the ignition unit accommodating chamber.

The bottom 25 forms an outwardly convex surface when the cover 20 is mounted to the cup 19.

When the transfer charge container 7 and the igniter 6 are assembled into the gas generator, the transfer charge container 7 is first inserted into the ignition unit accommodating chamber 3. With the closed end of the cup of the transfer charge container placed in contact with the top wall portion 24 of the ignition unit accommodating chamber, the igniter 6 is inserted and the head portion 26 of the igniter is pressed against the cover bottom 25 of the transfer charge container until the flange 27 of the igniter 6 engages the stepped portion 28 of the center cylindrical portion 13. In this condition, the crimping portion 29 of the center cylindrical portion 13 is crimped.

The bottom 25 of the cover resiliently deflects as it receives a pressing force of the igniter head portion 26. The deflection of the bottom 25 exerts an resilient force to the top wall portion 24 of the ignition unit accommodating chamber and also to the igniter 6. In this way, the transfer charge container 7 is resiliently held between the top wall portion of the ignition unit accommodating chamber and the igniter.

In the gas generator of the above construction, when a sensor (not shown) detects an impact, its signal is sent to the igniter 6, which is then activated to ignite the transfer charge 12 which generates high-temperature flames. The flames pass through the passages 17 into the combustion chamber 4, break the wall of the canister and then ignite the gas generating agent 8 contained in the canister. The burning gas generating agent 8 produces a gas, which passes through the gas passing ports 18 uniformly into the coolant filter chamber 5. The gas passes through the coolant 10, during which period the gas is cooled and the combustion residues are further removed. When the gas passes through the filter 11, the remaining combustion residues are removed. The combustion gas thus cooled and cleaned enters through the gas discharge ports 1 into the airbag (not shown), inflating the airbag to form a cushion between an occupant and a hard structure and thereby protect the occupant from impacts.

What is claimed is:

1. A gas generator for an airbag, comprising:

a housing;

an ignition unit accommodating chamber formed in said housing, said chamber being defined at least by a wall;

an igniter provided in said ignition unit accommodating chamber, a head portion of said igniter opposing said wall; and a transfer charge container provided in said ignition unit accommodating chamber, said container making a direct contact with said wall at a first portion thereof and making contact with the head portion of said igniter at a second portion thereof, said second portion being formed with a resilient convex portion convexed from an inside to an outside of said transfer charge cup, said convex portion resiliently deflecting from the force of the igniter.

2. The gas generator according to claim 1, wherein said transfer charge container includes a cup portion for accommodating a transfer charge therein, and a cover portion for hermetically closing said cup portion, wherein said resilient convex portion is formed in one of a end face of said cup portion and said cover portion.

3. The gas generator according to claim 1, wherein said wall is an inner surface of said housing.

4. The gas generator according to claim 3, wherein ignition unit accommodating chamber is defined by the inner surface of the housing and a cylindrical member provided in said housing.

5. The gas generator according to claim 1, wherein said cup portion makes contact with said wall, and said cover portion makes contact with the head portion of said igniter.

6. The gas generator according to claim 5, wherein a diameter of the head portion of said igniter is smaller than a diameter of said cover portion.

7. A gas generator for an airbag, comprising:

a housing;

an ignition unit accommodating chamber formed in said housing, said chamber being defined at least by a wall;

an igniter provided in said ignition unit accommodating chamber, a head portion of said igniter opposing said wall;

a transfer charge container provided in said ignition unit accommodating chamber, said container making a direct contact with said wall at a first portion thereof and making contact with the head portion of said igniter at a second portion thereof, said container having a resilient convex portion formed in one of said first portion and said second portion, said convex portion resiliently deflecting from the force of the igniter; and an automatic ignition material accommodated in said transfer charge container adjacent said first portion.

\* \* \* \* \*

UNITED STATES PATENT AND TRADEMARK OFFICE
CERTIFICATE OF CORRECTION

PATENT NO. : 6,273,464 B2
DATED : August 14, 2001
INVENTOR(S) : Masakazu Tokuda et al.

Page 1 of 1

It is certified that error appears in the above-identified patent and that said Letters Patent is hereby corrected as shown below:

<u>Title page,</u>
Item [30], Foreign Application Priority Data, please correct the Japanese application number from "7-244440" to -- 7-244400 --.

Signed and Sealed this

Twenty-first Day of May, 2002

Attest:

*Attesting Officer*

JAMES E. ROGAN
*Director of the United States Patent and Trademark Office*